Oct. 18, 1938.　　　P. A. CULLMAN　　　2,133,377
STREET LIGHT
Original Filed Dec. 9, 1933　　4 Sheets-Sheet 1
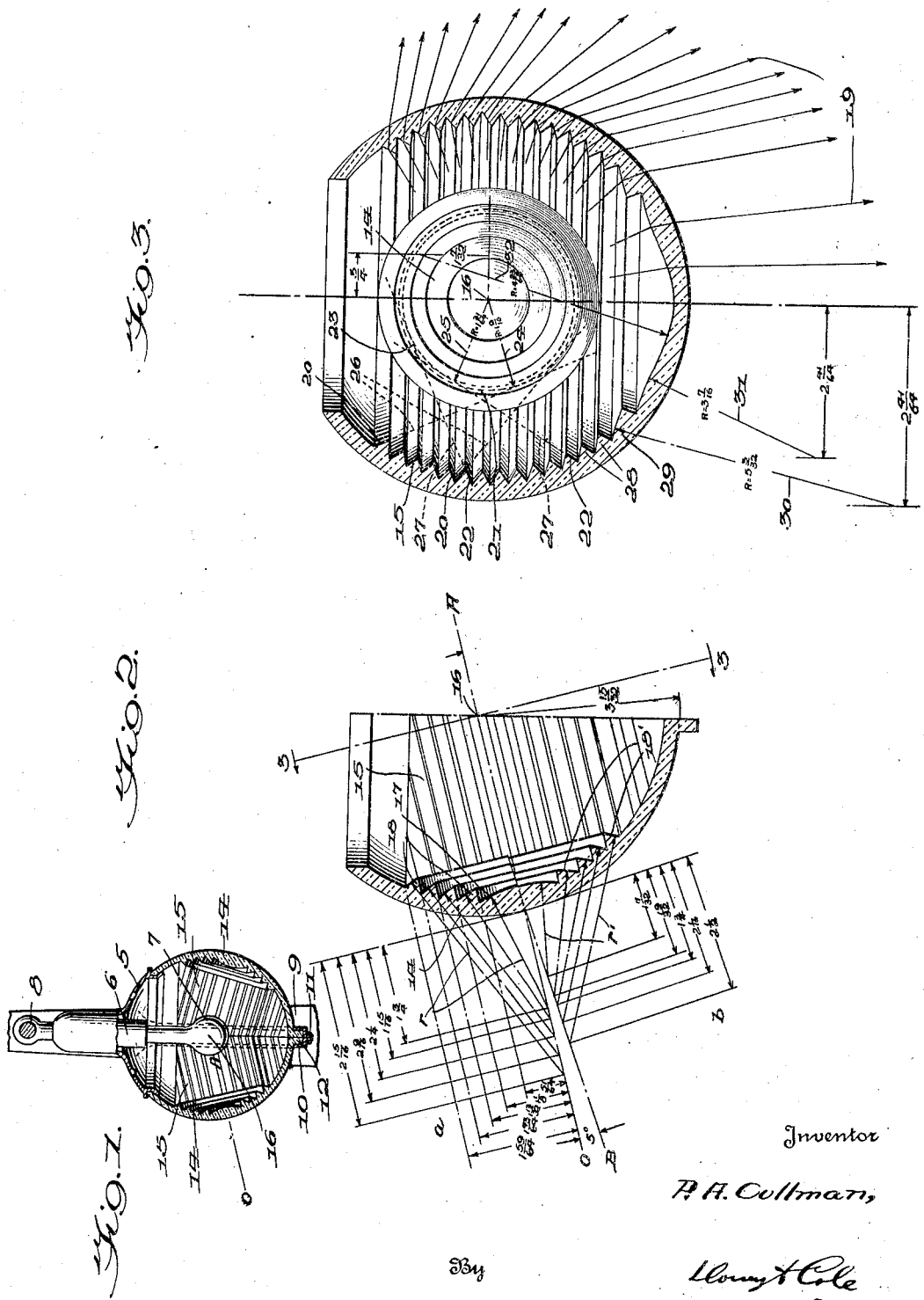
Inventor
P. A. Cullman,
By Lowry & Cole
Attorney

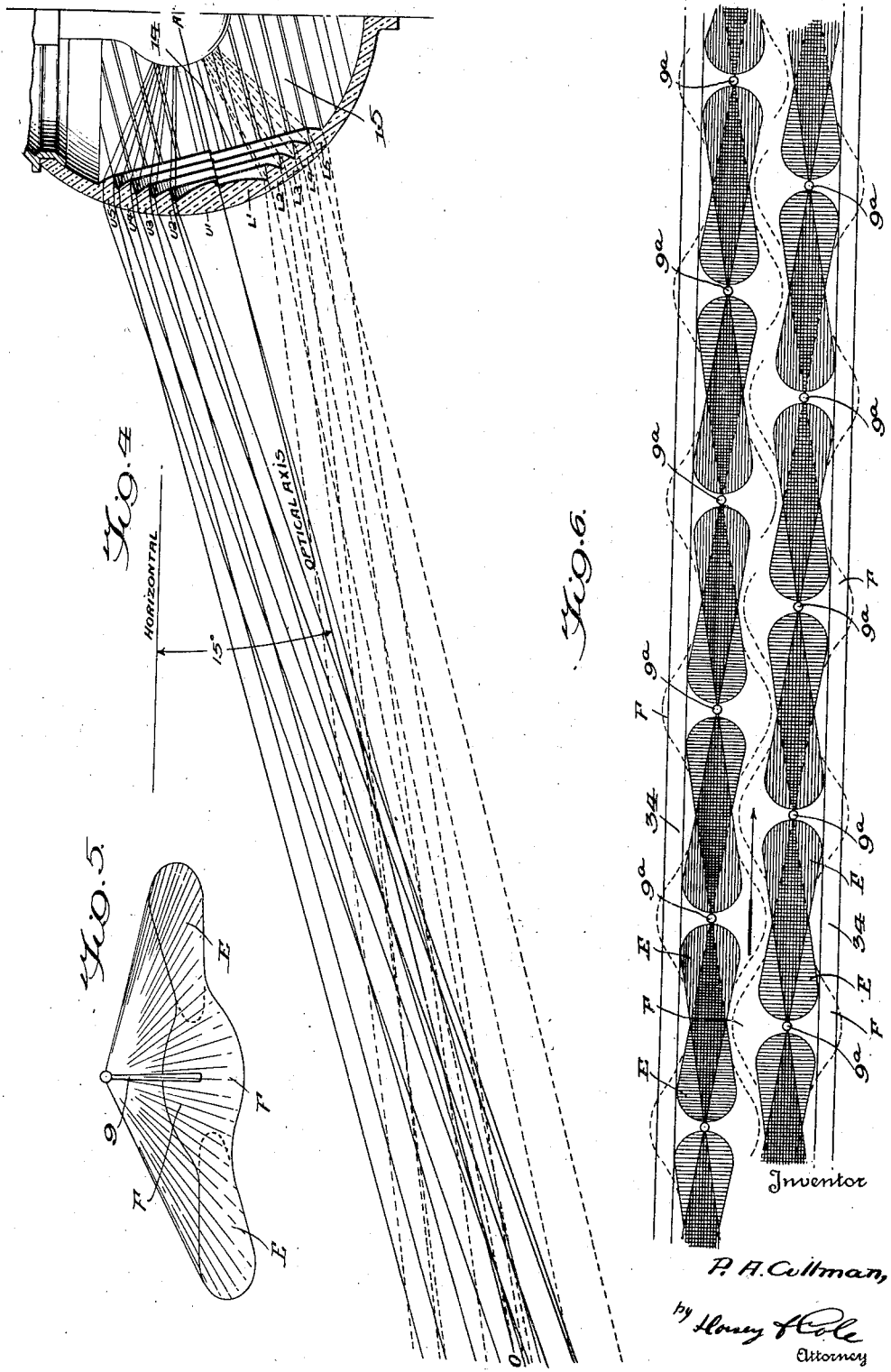

Oct. 18, 1938.  P. A. CULLMAN  2,133,377
STREET LIGHT
Original Filed Dec. 9, 1933   4 Sheets-Sheet 3
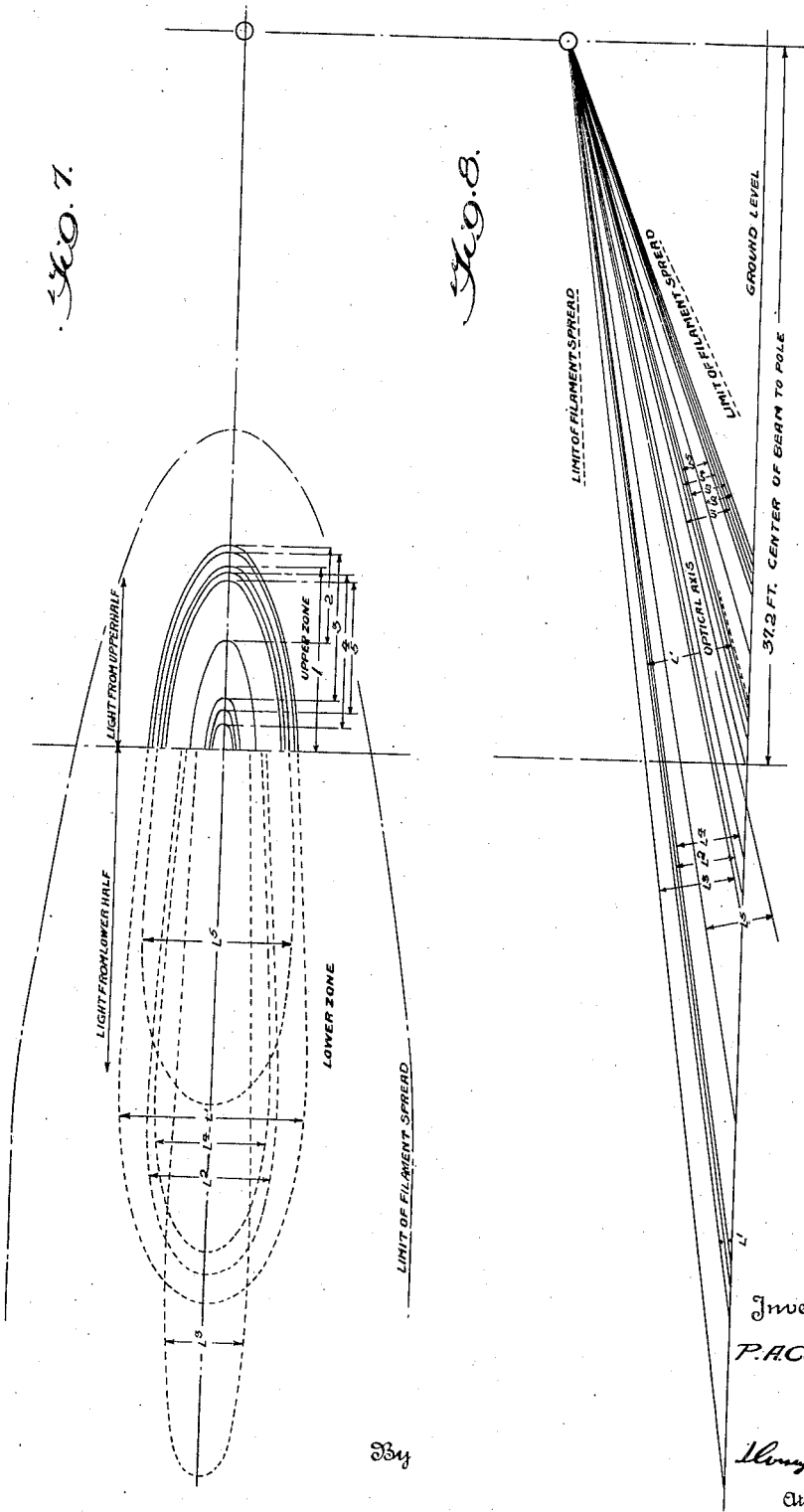
Inventor
P. A. Cullman
By
Attorney Oct. 18, 1938.   P. A. CULLMAN   2,133,377
STREET LIGHT
Original Filed Dec. 9, 1933    4 Sheets—Sheet 4
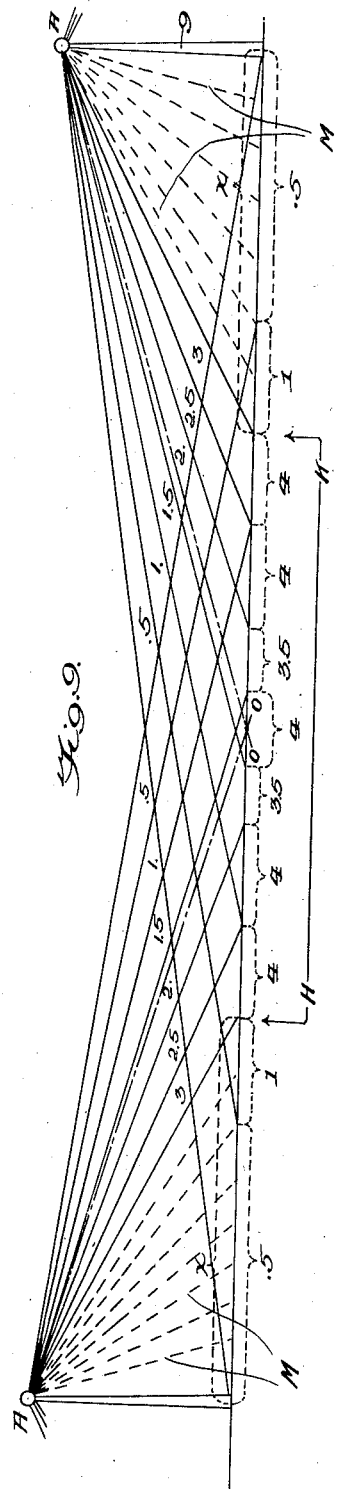
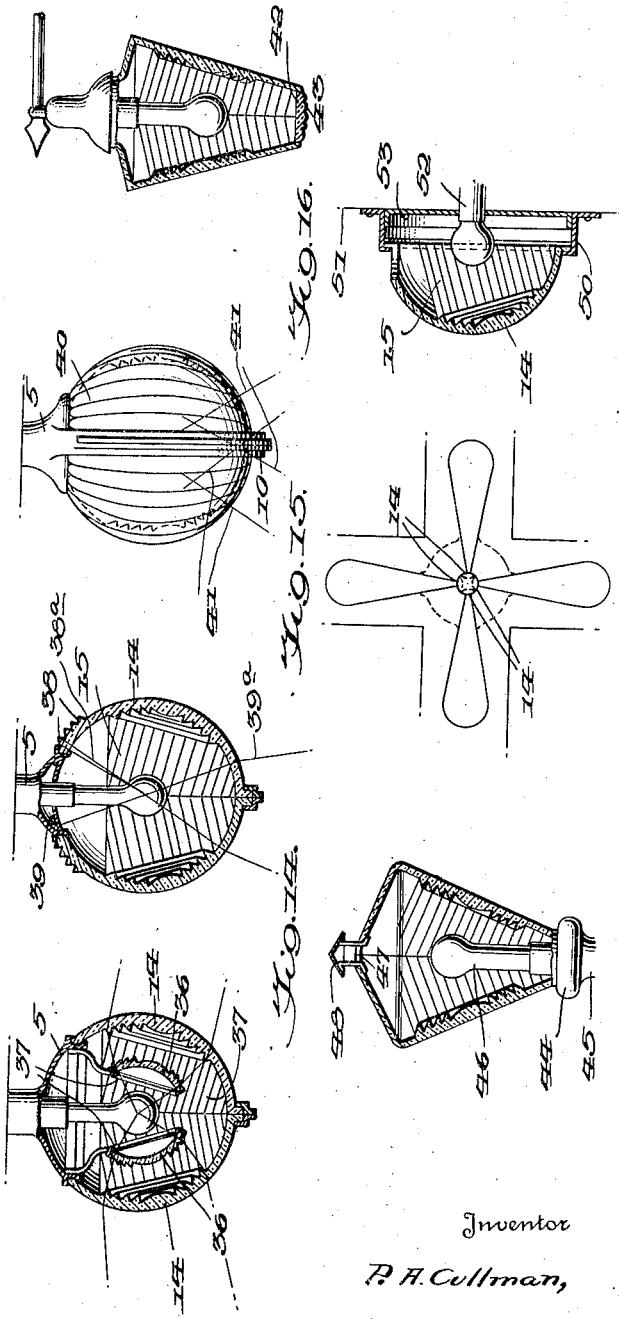
Inventor
P. A. Cullman,
By
Lovey & Cole
Attorney Patented Oct. 18, 1938

2,133,377

UNITED STATES PATENT OFFICE 2,133,377

STREET LIGHT

Philipp A. Cullman, New York, N. Y., assignor, by mesne assignments, to United States Holding Corporation, a corporation of Delaware Application December 9, 1933, Serial No. 701,703
Renewed August 28, 1937

16 Claims. (Cl. 240—25)

This invention relates to an improvement in light projectors, particularly suitable for lighting such areas as streets and roads in cities and towns, highways, etc., its use, however, not being limited to these purposes as it may also be found to be useful for other purposes such as the illumination of playing fields or stadiums, landing areas for aircraft, the flood lighting of buildings, et cetera. It may also be used with vehicles of various kinds, particularly aircraft in connection with which it may be carried by the aircraft, and used at night to illuminate the field upon which the aircraft is about to land.

In connection with its use for street lighting purposes, the invention has for one of its objects the provision of a relatively small and compact globular light projector adapted when mounted in proper position above a street to project beams of light in opposite directions to relatively long distances longitudinally of the street and to also illuminate the areas transversely of the street intermediate those illuminated by the main beams.

Another object is to provide the globe at opposite sides, with lenses of such construction as to properly form the main beams with such variations in light intensity in the various portions thereof along the area illuminated, that when a string of lights are mounted in proper position along a street, the portions of the main beams of adjacent lights will so overlap that the intensity of the light along the illuminated street will be substantially constant.

Another object is to so construct the light projecting globe that the portions intermediate the lenses will direct the useful rays issuing from the globe downwardly upon the street at angles more acute than the angles at which the main beams are directed, so that such rays will be used to illuminate areas along the street intermediate the areas illuminated by the main beams. Thus the area illuminated by the light as a whole, will be in the nature of an elongated oval with the light across the short axis, i. e., transversely of the street, being produced by the portions of the globe intermediate the lenses, and with the light along the long axis, i. e., longitudinally of the street, being provided by the main beams projected from such lenses.

Another object is to so construct the globe that while opposite main beams are projected therefrom, and areas intermediate the areas illuminated by such main beams are illuminated by the portions intermediate the lenses, the light rays will be so projected that those from the intermediate areas of the globe will merge with those forming the main beams in such manner that a relatively even distribution of light will be produced.

Another object is to provide a light-refracting globe having the characteristics outlined above which may be readily and cheaply manufactured, and one in which the lenses form part of the glass body of the globe and are formed simultaneously with the formation of the refracting elements which occupy the areas of the globe intermediate the lenses.

Another object is to provide a light-transmitting globe having the above characteristics in which, from opposite sides of a transverse plane intermediate the lenses, the optical axes of the lenses extend downwardly below the horizontal, the refracting prisms also extending downwardly in opposite directions from said transverse plane toward said lenses and substantially parallel to said optical axes, whereby a single plunger having its axis co-incident with the optical axis of one of the lenses, may be used to form each globe half, and whereby, as the points of projection of light from a source within the globe moves along said prisms toward the lenses, the angles at which the downwardly directed rays projected by said prisms strike the street, will become less and less acute, so that as the points of projection approach the lenses, the rays issuing from the prisms will merge with rays issuing from the lenses.

A further object of the invention is to provide a light projector for street lighting purposes, in which the light flux projected will be of such configuration where it intercepts the street surface, that by placing the lights in rows along opposite sides of a street with the lights in one row placed in staggered relationship with the lights in the other row, the areas intermediate the lights transversely of the street will be adequately illuminated, as well as the areas between the lights in each row and along the sidewalks, the light at the same time being controlled so as to shine as little as possible into the windows of houses along the street.

With these and other objects in view, which will become more apparent as the description proceeds, reference is had to the accompanying drawings which illustrate some of the forms which the invention may assume, and in which,—

Figure 1 is a vertical sectional view through a street lighting globe constructed according to my invention.

Figure 2 is a vertical sectional view on a larger scale through one of the globe sections showing constructional details.

Figure 3 is a view at right angles to Figure 2, showing constructional details on the left hand side of the figure, and showing distribution of light on the right hand side of the figure, such figure being taken along the plane indicated by the line 3—3 of Figure 2, for purpose of convenience of illustration.

Figure 4 is a view similar to Figure 2, illustrating the light distribution from the lens.

Figure 5 is a perspective view of the geometrical figure occupied by the light flux from the globe.

Figure 6 is a diagrammatic plan view showing the light distribution along the street.

Figure 7 is a diagrammatic plan view showing distribution of the light where it intersects the street in the beam projected by the lens element of the globe.

Figure 8 represents a diagrammatic vertical section through the beam from the lens element of the globe.

Figure 9 represents a vertical diagrammatic sectional view illustrating the distribution of light between adjacent globes when mounted along a street, illustrating the substantial evenness of illumination produced between the street lights.

Figure 10 represents a vertical sectional view illustrating the use of condenser lenses.

Figure 11 represents a vertical sectional view, showing a modified form in which the use of reflecting prisms and a reflector is illustrated.

Figure 12 represents an elevational view illustrating the use of flutings.

Figure 13 represents a vertical sectional view showing a modified shape of globe and showing the use of a dispersing lens at the lower end thereof.

Figure 14 is a vertical sectional view showing another shape of globe mounted at the upper end of a lamp post.

Figure 15 represents a plan view showing the use of a light having two sets of lenses at a street intersection.

Figure 16 is a vertical sectional view illustrating the use of the invention against the wall of a building.

Referring more particularly to the drawings, the light is in the form of a globe divided vertically and diametrically into two similar sections placed edge to edge, as shown in Figure 1, such sections being suspended from a suitable metallic holder 5 which houses a socket 6 in which the lamp 7 is secured. The holder is suspended in suitable manner above the street, as for instance, from the cross arm 8 of a pole 9. A split ring 10 of proper proportions, the sections of which may be secured together by screws or otherwise as at 11, and which is connected in suitable manner to the holder 5, engages the flanges 12 of the adjacent edges of the globe sections, and thus secures such sections together and against the holder.

Each of the globe sections is similarly formed, and has thereon a lens 14 of modified Fresnel construction, the optical axis O—A of which extends downwardly at a suitable angle below the horizontal, dependent upon the height above the ground at which the light is to be suspended. For instance, if the light is to be placed at a distance of ten feet from the ground, which is a convenient average height for the street lights in cities and towns, the lens may be disposed so that its optical axis extends downwardly about 15° below the horizontal. This would place the farthermost edges of the beam projected by the light at a distance of about seventy-four feet along the street from the light pole, and for convenience of illustration, I have chosen the foregoing height of the light and angle of optical axis, in connection with the light distribution to be hereinafter more fully described. It will be understood that I may, by including the globe sections in different positions with respect to each other, and using a supporting ring of proper proportions vary the angle of the beam, as desired, from one or both of the lenses of the globe.

From the lens extends rearwardly and upwardly toward the edge of the globe section, a series of light-refracting prisms 15, the uppermost of which is disposed at about the upper edge of the lens. These prisms substantially cover the inner surface of the globe section unoccupied by the lens, and extending downwardly to near the bottom of the section. Such prisms are arranged at an angle to the horizontal and their edges lie in planes substantially parallel to the optical axis. Thus, when two globe sections are assembled as illustrated in Figure 1, the globe includes the opposite lenses 14 facing downwardly at the desired angle, and the prisms 15 extending upwardly and rearwardly from the lenses toward the meeting edges of the globe sections, as illustrated in Figure 1. The focal region for the globe in which the lamp filament will be placed, is at 16, and for purposes of discussion, is assumed to be a point, though it will be understood that the filament of a standard lamp is of appreciable size, and that the optical elements in practice are designed for use in connection with such filament.

I have illustrated in Figures 2 and 3, an example of one form of construction that may be followed by the optical elements of the globe, Figure 2 being utilized as illustrating the construction of the lens 14, and the left hand half of Figure 3 being utilized as illustrating the construction of the refracting prisms 15. The construction data is given in inches. Referring more particularly to Figure 2, the optical axis O—A extends from the focal region 16 downwardly at the desired angle and along this axis the faces of the upper half of the bull's eye 17, and the upper stepped zones 18 of the lens are struck from centers with increasing radii of curvature, and at increasing distances from the outer surface of the lens as the zones approach the upper edge thereof, as illustrated by the radii r. The faces of the lower half of the bull's eye and of the lower stepped zones 18', are struck from centers along a line B, intersecting the optical axis at the outer surface of the lens, and extending downwardly at an angle therebelow (which angle may be substantially 5°), with increasing radii and at increasing distances from the outer surface of the lens as the lower edge thereof is approached, as illustrated by the radii r'. The radii of the lower lens half are upon the whole, preferably somewhat shorter and the distances between zone centers somewhat less, than for the upper lens half, in order to distribute the rays from the lower lens half, which, as hereinafter pointed out, comprise substantially the upper half of the beam, over a wider area than the rays from the upper lens half. The construction data for the inner faces of the various zones of the lens is indicated generally at a and b, respectively.

Referring now more particularly to Figure 3, the prisms 15 are formed to bend downwardly through substantially the maximum degree, rays from the light source incident on their upper faces, as indicated by the rays 19, the upper faces 20 of the prisms lying in planes tangent to a circle 21 concentric with the focal region 16 lying in a plane at right angles to the optical axis O—A, while the lower faces 22 of the prisms lie in planes tangent to a circle 23, of smaller diameter than the circle 21, concentric therewith, and likewise lying in a plane at right angles to the optical axis, the radii of such circles being indicated at 24 and 25, respectively, tangents in which respective faces lie, being illustrated at 26 and 27, respectively. As thus constructed, the prisms may be impressed by a plunger simultaneously with the formation of the lens, and at the same time bring the light rays falling on them from the light source as rapidly downwardly as is practically possible, it being noted that the lower surfaces of the prisms at the section shown on the right of Figure 3 are substantially parallel to the paths taken by the light rays while traversing the prisms. The lower few prisms 28, and lowermost prism 29 may be made with smaller refractive angles so as to bend the light rays passing therethrough to a less degree than the light rays passing through the other prisms, whereby as the lower regions of the globe are approached, the light rays extending therethrough, will be projected substantially vertically downwardly, rather than at an angle across the vertical axis of the globe, which would be the case were the angles of refraction of the lower several prisms maintained the same as the remainder. It will be understood that if desired, I may maintain the refractive angles of the lower several prisms the same as those around the side portions of the globe in which event the light rays projected through the opposite sides of the globe at the lower regions thereof would cross the vertical axis before striking the ground. If prism formation in the lower portions of the globe of less acute angles of refraction is desired, the upper face of the prism 29, for instance, may be struck with a relatively long radius, as indicated at 30, and the upper surface of the lower region of the globe may be formed on arcs struck with radii such as 31 and 32, respectively. Such formation will cause the rays passing through the lower portion of the globe to move substantially straight downwardly toward the street surface. It will be understood that the lessening in refractive angles of the lower several zones and the lower region of the globe will be gradual, so that there will not be any discernible hiatus between the light flux produced by the prisms at the side portions of the globe and that produced by the lower regions thereof.

By constructing the prisms as pointed out above, not only may they be formed simultaneously with the lens, and project the rays from the intermediate portions of the globe downwardly, but the further advantage is obtained that as the points of projection from the prisms approach toward the lens, the rays passing through the prisms will be bent, as the angles of incidence, due to the downward inclination of the prisms toward the lens, decrease, to gradually smaller and smaller degrees, until, as the points of projection come near the lens, the rays from the prisms will be bent into directions similar to directions taken by rays composing the beam from the lens, to be hereafter more fully described, and will intermingle with the rays in the beam so that a continuity of light from the areas of the globe between the lenses, and that projected from the lenses, will be maintained, and a geometrical shape of light similar to that illustrated in Figure 5 will result from the light flux from the entire globe utilized on the street surface. In this figure, the beams from the lenses where they intersect the street surface, are indicated by the areas E, while the rays from the portions of the globe intervening between the lenses are indicated by the areas F, and it will be seen how the areas F transversely of the street beneath the globe gradually taper off in width and merge with the beams which form areas E, so that there are no apparent interruptions throughout the length along the street of the light falling thereon from the globe as an entirety.

In the light projection from the lens, in general, the beam section from the zones of the upper lens half crosses the optical axis and in falling below the same becomes inverted and forms the lower half of the beam at the street, while the beam section from the lower zones of the lens crosses the axis and in falling above the same likewise becomes inverted and forms the upper half of the beam.

Referring more particularly to Figure 4, the zones in the upper and lower portions of the lens have been marked $U^1$ to $U^5$, respectively, for the upper zones, and $L^1$ to $L^5$, respectively, for the lower zones, in order to assist in understanding the analysis of the beam projection illustrated in Figures 7 and 8. In these latter figures, the pencils of rays from the respective lens zones have been indicated by similar markings. It will be seen that the rays of light from the source incident on the inner faces of the zones of the upper half of the lens will be projected downwardly in the general direction of the optical axis of the lens, the light rays emitted from points adjacent such axis being substantially parallel therewith, while the rays emitted from points further removed from such axis will gradually converge toward and eventually cross the axis to lie therebelow, the curvatures of the zones being such that the rays from each zone cross each other and intermingle to form a smooth distribution of light, and the rays from the various zones overlap, the light from the upper lens half thus forming substantially the lower portion of the beam which defines the pattern thereof between the intersection of the optical axis with the roadway and the lamp post. Rays from the light source incident on the zones of the lower half of the lens will be emitted in directions to likewise cross the optical axis and intermingle and overlap to form the pattern of the beam on the roadway beyond the intersection of the optical axis therewith, the curvature of the lower zones also being such that the rays from each zone cross and intermingle with each other. Further, the section of the beam from the lower zones is spread to a somewhat greater extent, due to the difference in curvatures of the lower zones from the curvatures of the upper zones, than the section of the beam from the upper zones, to thereby gradually broaden and lengthen the beam as it extends along the street away from the lamp post. In this way, the beams from the lenses are substantially of the form illustrated in Figures 7 and 8, it being understood that while in general, the rays from the lower lens half form the portions of the beam that extend to distant regions and the rays from the upper lens half form the portions of the beam nearer the lamp post, there will be sufficient intermingling and overlapping of these two portions along and adjacent the optical axis, to prevent any interruption in the smoothness of light distribution. This relative evenness of distribution is enhanced by the construction whereby not only the rays from the upper and lower halves considered as a whole cross and intermingle, but also the rays from each zone cross each other and intermingle with rays from adjacent zones.

Due to the fact that the filament is of appreciable size, there will be some spread of the beam in practice, but this will not modify the distribution in the beam. The spread of the beam due to filament size has been indicated in Figures 7 and 8, and is utilized to illuminate in part the sidewalks along the street, as will hereinafter appear.

In Figure 6, I have illustrated an arrangement in which the lights are placed on posts in rows along opposite sides of a street, with the lights in one row placed in staggered relationship with the lights in the other row (the positions of the light being indicated at 9a), and with the lights in each row being separated by a distance substantially equal to the distance at which the farthest-most portions of the beams from the adjacent light will intersect the roadway, this distance being in the assumed example, about seventy-four feet. As thus arranged, it will be noted that the beams from the lenses of adjacent lights overlap each other, as indicated by the overlapping areas E, and that the areas F from the portions of the globe intervening between the lenses are arranged in staggered relationship, the areas of light F produced by the portions of the globe intermediate the lenses of one side of the street substantially overlapping the intersecting portions of the beams on the other side of the street, as well as the adjacent light areas F from the globes along the other side of the street, so that a smoothness and continuity of light throughout the length and breadth of the street is obtained. In the figure, the areas F have been shown as slightly separated, for purposes of clearness of illustration, but in practice, these areas will preferably occur in overlapping relationship. The sidewalks are indicated at 34, and it will be seen that these will be sufficiently illuminated by the areas F, and also by the spread of the beams from the lenses due to filament size. At the same time, it will be noted that by reason of the rays from the intermediate portions of the globes being directed downwardly upon the street and sidewalk surfaces, as little light as possible will be allowed to shine into the windows of houses along the street, and thus an objectionable feature of many street lighting systems is done away with.

The intensity of the beams from the lenses where such beams intersect the street surface, will gradually increase from the portions of the beams farthest from the lamp post towards the portions of the beams nearest to the lamp post, and in Figure 9 I have illustrated the distribution of light intensity from adjacent overlapping beams, in which the gradual increase of candle-power from .5, to 3 in intensity of various sections of the beams, is illustrated. In the overlapping portions of the beams along the street, from the point H to the point K, it will be seen that the intensities of the sections of one beam added to those of the other, will produce a substantially even distribution of light along the street surface, the candlepower in the various overlapping zones of the street surface, being indicated. Between the area at H—K and the lamp posts, the intensity from the beams drops off in the areas X, as indicated, but the rays from the lower portions of the globes will fall upon these areas, as illustrated by the rays M, to thus build up the light intensities in these areas to substantially that in the area H—K, so that a substantially even distribution of light along the entire street is thus obtained. With this arrangement of the lights in illuminating a street, it will be seen that the rays of higher intensity from the upper lens half of one light, are superimposed on the rays of lower intensity from the lower lens half of the next adjacent light, and the rays of lower intensity from the lower half of first said light, are superimposed on the rays of higher intensity from the upper half of said adjacent light, the rays of high and low intensity, respectively, from one light thus building up the rays of low and high intensity, respectively, from the next light.

In order to increase the angle of light from the source utilized by the lenses 14, I may, if desired, interpose between said lenses and the light source, condensing lenses 36—36, which may be held in rings 37 suspended in suitable manner from the holder 5 as illustrated in Fig. 10. Thus the amount of light projected through the lenses 14 may be increased. The use of the condensers can also be adopted in order to shorten the focal length of the lenses 14, and to allow the use of a smaller globe if desired, or, through the increase in the angle of light subtended, the use of a small candle-powered lamp, with substantially the same results as far as the light intensity of the beams are concerned as that obtained with a higher candle-powered lamp, but without the use of condensers.

I may also, where desired, make use of total reflecting prisms 38 (see Fig. 11) on the upper portions of the globe above the lenses 14 and prisms 15, so that light from the source upon striking said prisms 38 will be reflected back through the light source, as indicated by the ray 38a, and thus increase the intensity of the light passing through the lower portions of the globe, and I may also use a reflector 39, for instance, of spherical formation, at the upper part of the globe within the holder 5, to likewise utilize the light which would otherwise be absorbed by the holder and reflect such light back through the walls, as indicated by the ray 39a, to increase the intensity of the light projected through the bottom portions of the globe.

In order to obtain a more even spread of the light rays, I may, if desired, provide the globe with flutings, such as illustrated at 40 in Figure 12, which flutings will cause the light rays issuing from the lateral portions thereof to cross and intermingle, as indicated by the rays 41, and thus result in a very smooth and even distribution. If the street to be illuminated is of the width to require it, such flutings may be superposed over the lenses, as well as over the side portions of the globe, so as to increase the horizontal width of the beams projected by the lenses. The flutings used on the intermediate portions of the globe or on the lens, may be of constant curvature, or may be of varying curvature, in order to obtain evenness of distribution desired for the particular conditions under which the light is being used.

The globe made according to my invention is susceptible of various changes in form, and the lamp may be mounted either in the upper or lower portion thereof, as illustrated in Figures 13 and 14. In Figure 13, for instance, the globe is illustrated as being of substantially inverted pyramidal shape with a light-diffusing lens 42 mounted at the lower portion thereof on which refracting elements 43 are formed, such lens diffusing light downwardly onto the ground immediately beneath the globe. In this form of the invention, the globe would be suspended from its upper end, for instance, as illustrated. Also the globe may be of inverted conical form, as shown in Figure 14, in this case being mounted adjacent its lower portion (which will be open) upon a holder 44 supported upon the top of a lamp post 45, the lamp 46 extending upwardly into the globe from a suitable socket carried by the lamp post. An opening may also be provided at the top as at 47, and in such opening, a ventilating cap 48 may be mounted.

In some instances, it will be desirable to mount a light above the middle of street intersections, and in this case, I may utilize a globe in which two pair of lenses are employed, as illustrated in Figure 15, and if only one globe is employed, I may, in order to concentrate most of the light within a comparatively short radius of the street intersection, raise the light source above the focal region of the globe so as to thus bend the beams projected from the lenses, and the rays projected through the intervening portions of the globe, downwardly at sharper angles, and thus bring the areas illuminated closer up toward the light and concentrate it in the vicinity of the street intersection.

In some localities it may be desirable to mount a light against the side of a building, for instance, in which case, as illustrated in Figure 16, I may use only one globe section, and mount the same in a suitable holder 50, against the wall 51 of the building. In this type of installation, the lamp may be mounted horizontally in a suitable socket 52 disposed against the wall of the building, and a suitable reflector 53 within the holder 50 may be used to utilize the light which would otherwise be lost against the building wall, and reflect such light outwardly through the globe section.

While, in the foregoing, I have made a detailed exposition of some of the forms which the invention may take, not only as concerns its optical characteristics, but also as concerns the shape, formation and size of the globe, and different methods of mounting the same, and uses to which it may be put, it will be understood that I do not intend to be limited to the specific examples herein above chosen for illustrative purposes, but may make such modifications, changes and rearrangements of parts, for instance, changes in the dimensions and radii of the lens steps, and in the angles and curvatures of the refracting prisms, in order to vary the light distribution above described, as do not depart from the spirit of the invention and the scope of the appended claims.

Having thus described my invention what I claim as new, and desire to secure by U. S. Letters Patent is:—

1. In a light projector, a glass body having formed thereon a lens of modified Fresnel construction having an optical axis extending downwardly below the horizontal, the zones on the upper half of the lens being struck from centers substantially along the optical axis at increasing distances and with increasing radii as the outer edge of the lens is approached, the zones on the lower half of the lens being struck from centers at increasing distances substantially along a line at an angle to and intersecting the optical axis at the outer face of the lens and with increasing radii as the outer edge of the lens is approached, in combination with refracting prisms whose edges lie in planes substantially parallel with the optical axis, and whose upper and lower faces respectively are substantially tangent to circles of different diameters lying in a plane at right angles to said optical axis.

2. In a light projector, a glass body having formed thereon a lens of modified Fresnel construction having an optical axis extending downwardly below the horizontal, the zones on the upper half of the lens being struck from centers substantially along the optical axis at increasing distances and with increasing radii as the outer edge of the lens is approached, the zones on the lower half of the lens being struck from centers at increasing distances substantially along a line at an angle to the optical axis and with increasing radii as the outer edge of the lens is approached, in combination with refracting prisms whose edges lie in planes substantially parallel with the optical axis.

3. In a light projector, a glass body having formed thereon a lens of modified Fresnel construction having an optical axis extending downwardly below the horizontal, the zones on the upper half of the lens and the zones on the lower half of the lens being struck respectively from their centers substantially along lines diverging from the lens with increasing radii as the outer edges of the lens are approached, in combination with refracting prisms, whose upper and lower faces respectively are substantially tangent to circles of different diameters lying in a plane substantially at right angles to said optical axis.

4. In a light projector, a glass body having formed thereon a lens of modified Fresnel construction having an optical axis extending downwardly below the horizontal, the zones on the upper half of the lens being struck from centers substantially along the optical axis at increasing distances and with increasing radii as the outer edge of the lens is approached, the zones on the lower half of the lens being struck from centers at increasing distances substantially along a line at an angle to the optical axis and with increasing radii as the outer edge of the lens is approached, in combination with refracting prisms extending upwardly and rearwardly from said lens.

5. In a light projector, a glass body having formed thereon a lens of Fresnel construction having an optical axis extending downwardly below the horizontal, the lens construction being modified to present upper and lower zones of varying curvature and refracting powers, in combination with refracting prisms whose edges lie in planes substantially parallel with the optical axis, and whose upper and lower faces respectively are substantially tangent to circles of different diameter lying in a plane substantially at right angles to said optical axis.

6. In a light projector, a glass body having formed thereon a lens of modified Fresnel construction having an optical axis extending downwardly below the horizontal, the zones of the upper and lower half of the lens being of varying curvature, in combination with refracting prisms whose upper and lower faces respectively are substantially tangent to circles of different diameters lying in a plane substantially at right angles to said optical axis.

7. In a light projector, a glass body having formed thereon a lens of modified Fresnel construction having an optical axis extending downwardly below the horizontal, the zones on the upper and lower half of the lens being of varying curvature and being struck respectively from centers lying respectively substantially along diverging lines, in combination with refracting prisms extending upwardly and rearwardly from the lens.

8. In a light projector, a glass body having a lens of modified Fresnel construction provided with a focal region and having an optical axis extending downwardly below the horizontal, the zones on the upper and lower half of the lens being of varying curvature and being struck with radii, the lengths of which for the zones on one half are respectively shorter than the lengths of those for the other half, and adapted to project into a beam rays from a light source at the focal region, in combination with refracting prisms whose upper and lower faces, respectively, are substantially tangent to circles of different diameter lying in a plane substantially at right angles to said optical axis and adapted to project downwardly rays originating from said light source.

9. In a light projector, a glass body having a lens of modified Fresnel construction forming a part thereof, and having a focal region, and an optical axis extending downwardly below the horizontal, the zones on the upper and lower half of the lens being struck respectively with radii of different length substantially along lines at an angle to each other, whereby with a light source at the focal region, a beam will be projected from said lens in which the beam section from the upper lens half crosses the optical axis and forms the lower half of the beam, while the beam section from the lower half of the lens crosses the axis and forms the upper half of the beam, in combination with refracting prisms extending upwardly and rearwardly from the lens in planes substantially parallel with the optical axis and adapted from said light source to project rays downwardly at decreasing angles as the points of projection approach said lens.

10. In combination, a plurality of light projectors arranged at substantial heights above a street in rows, with the projectors of one row disposed in staggered relationship with projectors of the other row, each projector having a glass body provided with a focal region and with opposite lenses, each lens having an optical axis inclined downwardly below the horizontal, the portions intermediate the lenses having light-refracting prisms extending from said lenses upwardly toward a transverse plane through the vertical axis of such projector, a light source at said focal region whereby beams from said lenses are projected downwardly in opposite directions to illuminate areas of the street intermediate the projectors in each row and rays from said intermediate portions of said projectors are directed laterally and downwardly to illuminate areas intervening between the areas illuminated by said beams, the projectors in each row being so spaced apart that the beams from the projectors therein overlap, the rows being so spaced apart that the areas illuminated from said intermediate portions of the projectors of one row overlap similar areas illuminated by adjacent projectors of the opposite row.

11. In combination, a plurality of light projectors arranged at substantial heights above a street in rows, each projector having a glass body provided with a focal region and with opposite lenses having optical axes inclined downwardly, the portions intermediate the lenses having light-refracting prisms, the prisms on opposite sides of a transverse plane through the vertical axis of said projector extending downwardly toward said lenses, a light source at said focal region, whereby beams from said lenses are projected downwardly in opposite directions to illuminate areas of the street intermediate the projectors in each row and rays from the intermediate portions of the projectors are directed laterally and downwardly to illuminate areas intervening between the areas illuminated by said beams.

12. In a light projector, a glass body having oppositely disposed Fresnel lenses modified to present upper and lower zones of varying curvature and refracting powers, the body above, below and between the lenses presenting prisms inclining downwardly toward the adjacent lens, the prisms between and below the lenses being of substantially maximum refractive power, the prisms above the lenses being of substantially total reflecting power.

13. In a light projector, a glass body having a lens of Fresnel construction modified to present upper zones struck from centers substantially along the optical axis at increasing distances and with increasing radii as the outer edge of the lens is approached, the lower half of the lens having zones struck from centers at increasing distances substantially along a line at an angle to and intersecting the optical axis at the outer face of the lens and with increasing radii as the outer edge of the lens is approached, combined with prisms above and below the lens with the prisms above the lens of substantially maximum refractive power and the prisms below the lens of substantially total reflecting power.

14. In a light projector, a glass body having a lens of Fresnel construction modified to present upper zones struck from centers substantially along the optical axis at increasing distances and with increasing radii as the outer edge of the lens is approached, the lower half of the lens having zones struck from centers at increasing distances substantially along a line at an angle to and intersecting the optical axis at the outer face of the lens and with increasing radii as the outer edge of the lens is approached, combined with prisms above and below the lens with the prisms above the lens of substantially maximum refractive power and the prisms below the lens of substantially total reflecting power, the prisms of substantially maximum refractive power having their edges in planes substantially parallel with the optical axis.

15. In a light projector, a glass body having a lens of Fresnel construction modified to present upper zones struck from centers substantially along the optical axis at increasing distances and with increasing radii as the outer edge of the lens is approached, the lower half of the lens having zones struck from centers at increasing distances substantially along a line at an angle to and intersecting the optical axis at the outer face of the lens and with increasing radii as the outer edge of the lens is approached, combined with prisms above and below the lens with the prisms above the lens of substantially maximum refractive power and the prisms below the lens of substantially total reflecting power, the refracting prisms having their upper and lower faces respectively substantially tangent to circles of different diameters lying in a plane substantially at right angles to the optical axis of the lens.

16. In a light projector, a glass body having a lens of Fresnel construction modified to present upper zones struck from centers substantially along the optical axis at increasing distances and with increasing radii as the outer edge of the lens is approached, the lower half of the lens having zones struck from centers at increasing distances substantially along a line at an angle to and intersecting the optical axis at the outer face of the lens and with increasing radii as the outer edge of the lens is approached, combined with prisms above and below the lens with the prisms above the lens of substantially maximum refractive power and the prisms below the lens of substantially total deflecting power, the refracting prisms extending upwardly and rearwardly from said lens.

PHILIPP A. CULLMAN.